Oct. 1, 1929.					T. S. KEMBLE					1,730,039
AUXILIARY SPRING AND BUMPER
Filed June 13, 1927			2 Sheets-Sheet 1

INVENTOR
Thomas S. Kemble
BY
Dodson
ATTORNEYS

Oct. 1, 1929.  T. S. KEMBLE  1,730,039
AUXILIARY SPRING AND BUMPER
Filed June 13, 1927  2 Sheets-Sheet 2

INVENTOR
ATTORNEYS

Patented Oct. 1, 1929

1,730,039

UNITED STATES PATENT OFFICE

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE

AUXILIARY SPRING AND BUMPER

Original application filed July 2, 1924, Serial No. 723,772. Divided and this application filed June 13, 1927. Serial No. 198,664.

My invention relates to automobile busses or trucks, such as are described in my copending application, Serial No. 723,772, of which this is a division, which is directed to a six wheel vehicle having a front pair of supporting wheels by which the vehicle may be steered and a rear four wheel drive.

As will appear from the hereinafter contained description, my auxiliary spring and bumper departs radically from the bumper on the rear axle of the conventional four-wheel-drive vehicle. In the conventional vehicle, the auxiliary bumper comes into play only after the main supporting spring has been deflected by a predetermined amount beyond the normal. Obviously, if a spring strong enough for the clearance is provided, no bumper is required, and in fact, at very slow speed none is ever necessary, as the clearance cannot be used up.

In my construction as described in my co-pending application, Serial No. 198,662 wherein the main supporting springs are pivoted at their center upon a trunnion (as is more fully and completely described in said application), if the vehicle slowly crosses a deep narrow ditch at right angles, first the front axle of the rear truck will contact with the chassis, or upon a bumper provided; then, as the front axle rises out of the ditch on the far side, and the rear axle descends into the ditch, the chassis frame will leave contact with the rear axle and finally make contact with the front axle.

From the foregoing it will be apparent, to persons skilled in the art, that in a conventional vehicle any bumper contact can only occur after the main supporting spring has been deflected a predetermined amount beyond normal, but, as will be apparent from the hereinafter contained description, bumper contact in my construction may occur without any deflection of the main supporting spring beyond the normal, and in fact, having reference to the concrete illustration above cited, where the front axle descends in crossing a ditch, the bumper contact will actually occur while the deflection of the main supporting spring is less than normal.

Furthermore, in a conventional vehicle the main supporting spring at all times carries a load which is related to the instantaneous height of the frame relative to the axle, and the bumper can carry only such excess load as would otherwise have deflected the main supporting spring beyond that allowed by the clearance provided.

In my construction, the auxiliary springs or bumpers on one axle may, under the condition recited, carry the full load while the main supporting spring is under less than normal, or even negative from normal, stress. It will be seen, therefore, that the springs which I provide are, as regards this one function, true auxiliary, or alternative, springs. To leave off these auxiliary springs would be equivalent to providing that under certain conditions the vehicle would be springless at the rear.

My means of accomplishing the foregoing objects and overcoming the difficulties presented in the conventional vehicle, as hereinafter set forth, may be more readily understood by having reference to the accompanying drawings, which are hereunto annexed and are a part of this specification, in which—

Similar reference numerals refer to similar parts throughout the entire description.

Figure 1:
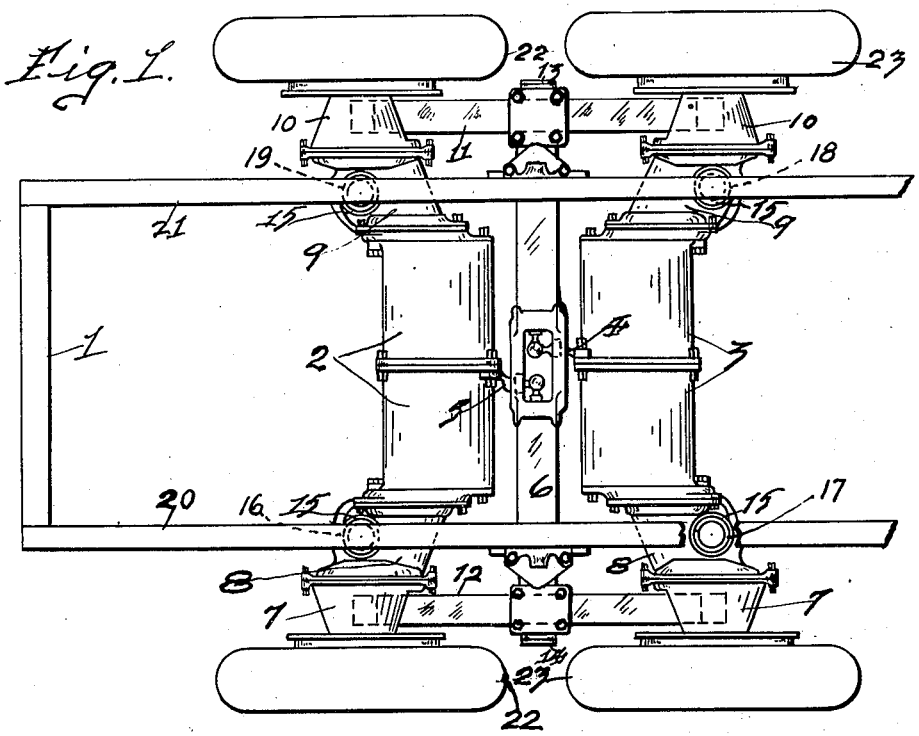
Fig. 1 is a top plan view of a fragmentary portion of the chassis of an automobile bus or truck, equipped with the four-wheel-drive set forth in my copending application, Serial No. 723,772, a portion of the frame being broken away to show the auxiliary springs.

As shown in the drawings, the vehicle is provided with a chassis, only a fragmentary portion of which is shown, as obviously it forms no part of my invention. The vehicle is driven by two pairs of electric motors, 2 and 3, which are mounted in tandem and suitably connected by radius rods 4 and 5 to a cross member 6. As described in my copending application, Serial No. 723,772, of which this is a division, the gear casings 7, 8, 9 and 10, and the casings for the motors 2 and 3, form the load-carrying axles. Each of these axles is provided with a pair of wheels, 22 and 23. Springs 11 and 12 are carried by trunnions 13 and 14, suitably mounted in the ends of the cross member 6. This, as described in my hereinbefore mentioned copending application, Serial No. 198,662 permits the axles to swing up and down, using the trunnions 13 and 14 as pivots. Upon the gear casings 7, 8, 9 and 10, are formed platforms 15, upon which I mount my auxiliary springs 16, 17, 18 and 19, immediately below the side frames 20 and 21 of the chassis 1. These auxiliary springs 16, 17, 18 and 19, may be secured in position in any of the usual or customary ways.

Figure 2:
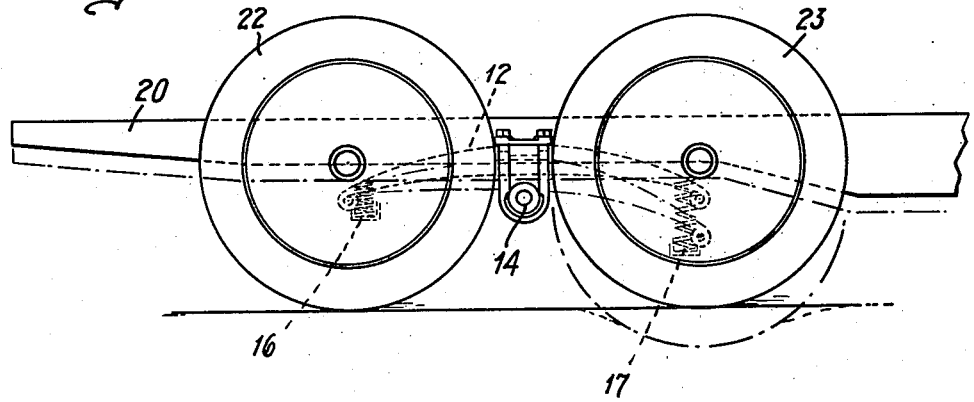
Fig. 2 is a side elevation of the same, showing my auxiliary springs in use when the vehicle is crossing a ditch, the altered position being shown in dot-and-dash lines.
Figure 3:
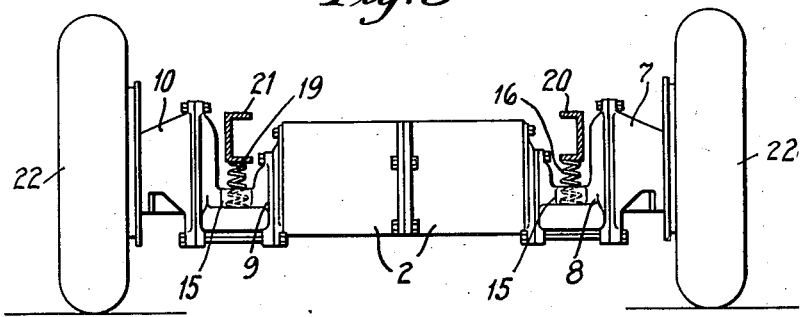
Fig. 3 is an end view, part of the chassis being shown in section, for the sake of clearness.
Figure 4:
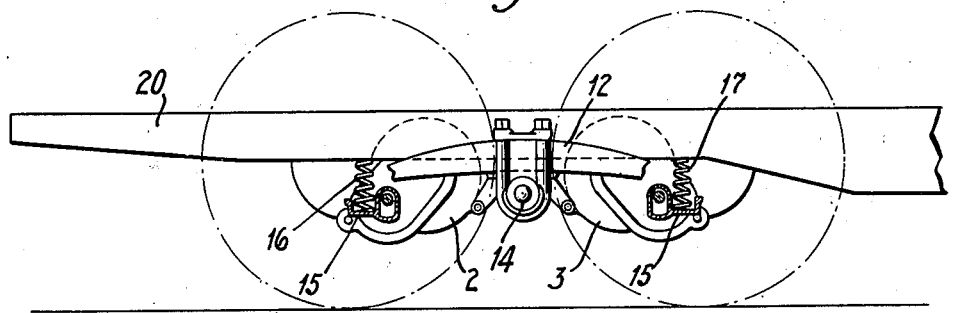
Fig. 4 is a side view, partly in section, with the wheels removed to show my auxiliary springs.
Figure 5:
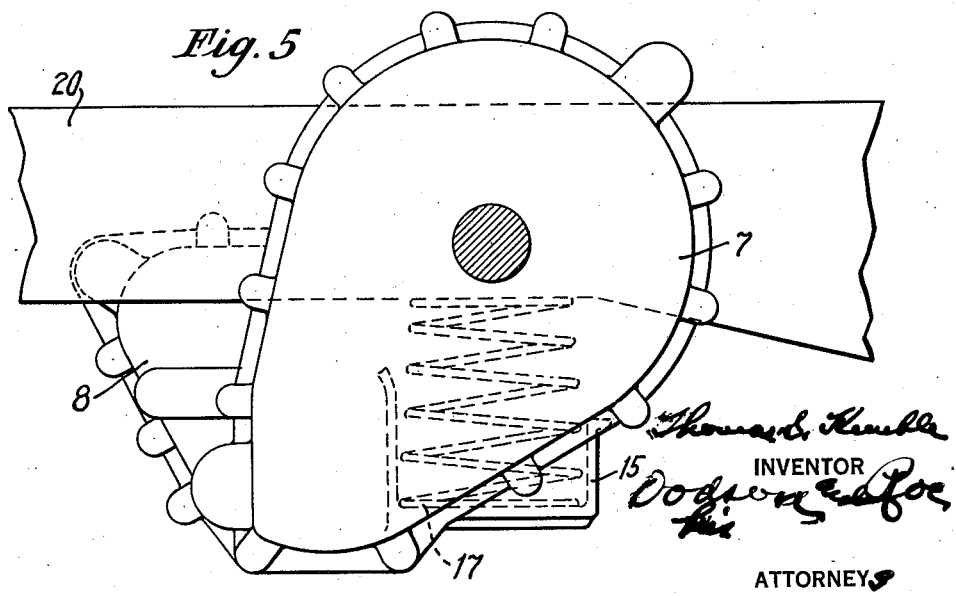
Fig. 5 is an enlarged detail view.

The operation of the auxiliary springs will be obvious from the foregoing description, and it will be apparent that as the wheels 23 descend into a ditch (not shown), as shown by the dot-and-dash lines in Fig. 2, the main springs 11 and 12 will swing upon the trunnions 13 and 14, bringing the side frames 20 and 21 of the chassis 1 into depressed contact with the auxiliary springs 16 and 19, leaving the auxiliary springs 17 and 18 free, and without any deflection whatsoever of the main springs 11 and 12. Practice has shown that this is extremely desirable to-day, in riding in busses equipped with this type of drive.

Although I have shown and described a specified form for my driving axles, it will be obvious that the invention is not confined to these specific details of construction thus shown and illustrated, and that the illustrations are solely for the purpose of disclosing a preferred form of embodiment of my invention.

Having described my invention, what I regard as new and desire to secure by Letters Patent of the United States, is:

1. In a vehicle having front supporting wheels and two rear axles adjacent each other, a chassis frame supported at one end on the two wheels and at the other end on the pair of driving axles, springs which connect said driving axles, trunnions secured to said chassis frame, said trunnions being parallel to said driving axles, said springs being mounted on said trunnions, other springs mounted intermediate said driving axles and said chassis frame, whereby free swinging of said driving axles about said trunnions is resisted within predetermined limits.

2. In a vehicle having front supporting wheels and two rear driving axles adjacent each other, a chassis frame supported at one end on the two wheels and at the other end on the pair of driving axles, springs which connect said driving axles, trunnions secured to said chassis frame, said trunnions being parallel to said driving axles, said springs being mounted on said trunnions, other springs mounted adjacent the ends of the first named springs and intermediate each of said driving axles and said chassis frame whereby free swinging of said axles about said trunnions is resisted within predetermined limits.

THOMAS S. KEMBLE.